(No Model.)
F. TREBAU.
SELF CLEANSING FILTER.
No. 387,607. Patented Aug. 7, 1888.
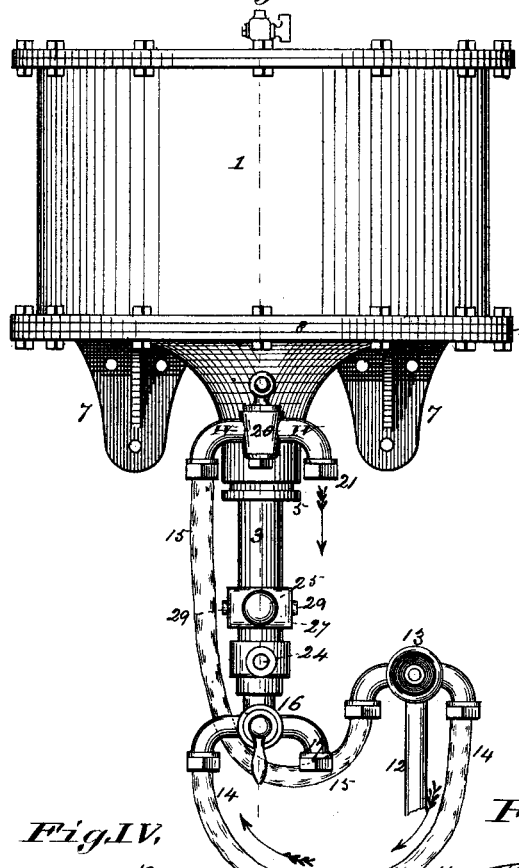
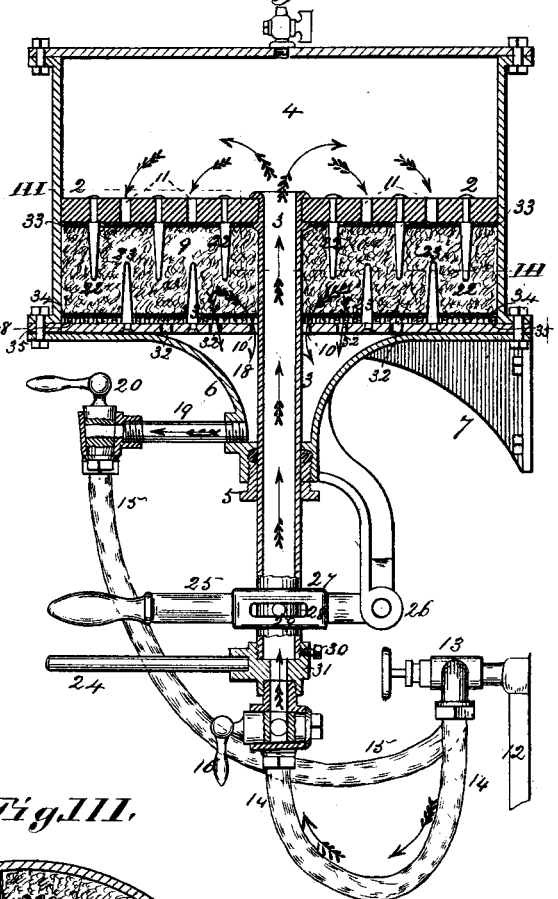
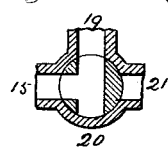
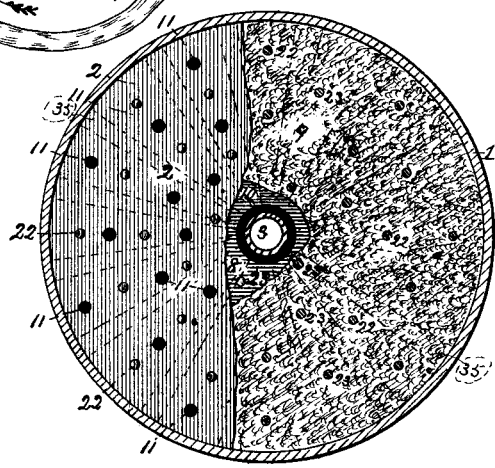
Attest,
E. Arthur
E. Ashley
Inventor,
Frank Trebau.
By Knight Bro.
Attys

United States Patent Office.

FRANK TREBAU, OF ST. LOUIS, MISSOURI, ASSIGNOR OF TWO-THIRDS TO RUDOLPH STECHER AND CLEMENS FISCHER, BOTH OF SAME PLACE.

SELF-CLEANSING FILTER.

SPECIFICATION forming part of Letters Patent No. 387,607, dated August 7, 1888.

Application filed December 14, 1887. Serial No. 257,883. (No model.)

*To all whom it may concern:*

Be it known that I, FRANK TREBAU, of the city of St. Louis, in the State of Missouri, have invented a certain new and useful Improvement in Self-Cleansing Filters, of which the following is a full, clear, and exact description, reference being had to the accompanying drawings, forming part of this specification.

This invention is an improvement on my filter for which Letters Patent No. 368,629 were granted to me August 23, 1887, my present invention having a novel device for stirring the filtering material, with other novel details, also set forth in the claim.

Figure I is a front elevation of the filter. Fig. II is a vertical section at II II, Fig. I. Fig. III is a horizontal section at III III, Fig. II. Fig. IV is an enlarged section of one of the three-way cocks at IV IV, Fig. 1.

1 is an inverted cylinder having a piston, 2, whose rod 3 is tubular and is open through the piston so as to communicate with the chamber 4 above the piston. The tubular rod or tube 3 extends through a stuffing-box, 5, in the extension 6 of the cylinder-head. The cylinder is shown with brackets 7, by which it may be attached to a wall or upright; but it may be supported on a suitable frame.

8 is the bottom of the chamber 9, containing the filtering material, which may very properly be composed of sponge cut into small pieces; but I wish it understood that I do not confine myself to any particular material for the purpose of filtering.

The tubular rod 3 passes through an orifice, 10, of larger diameter in the bottom plate or board, 8, the filtered liquid passing through the annular space between the rod or tube 3 and the plate 8. The piston has orifices 11, through which the liquid passes.

12 is a pipe, which may be put in connection with a hydrant or with any other supply of liquid to be filtered.

13 is a three-way cock, by which the pipe 12 may be closed, or by which it may be put in connection with either of the hose-pipes 14 or 15. The hose 14 is in connection with the lower end of the tube 3, so that liquid may be made to flow from the pipe 12 through the pipe 14 and tube 3 into the chamber 4, from which it passes through the filtering material in chamber 9.

16 is a three-way cock, by which the connection between the pipe 14 and tube 3 may be closed, or by which either the pipe or tube may be thrown in connection with a discharge-spout, 17.

The filtered liquid passes from the chamber 9 through the orifice 10 into a chamber, 18, in the extension 6, from which chamber the liquid enters a pipe, 19, and ordinarily passes through a three-way cock, 20, to the discharge-spout 21. The cock 20 is constructed so that it may be used to close the pipe 19, or to put it in connection with the discharge-spout 21, (as before mentioned,) or with the hose 15. The piston has pins 22 extending down into the chamber 9, and the bottom 8 has pins 23 extending up into this chamber 9, so that when the piston is turned the filtering material is stirred by the pins. This is done when the filter is being washed out. The piston is turned by means of a handle, 24, extending from the tube 3, (which forms the piston-rod.)

25 is a lever fulcrumed at 26, and having a yoke, 27, through which the tube 3 passes. The yoke is slotted at 28 to receive studs 29, projecting from the tube, so that by lifting or lowering the end of the lever the piston may be raised and lowered. The slot is made long enough to allow the piston to be turned backward and forward sufficiently for the stirring action of the pins upon the filtering material. The flexible pipes 14 and 15 allow the described vertical and reciprocating movements of the piston and tube 3.

30 is a set-screw in the collar 31, whose end bears against the tubular rod 3 and locks the collar to the rod.

The bottom plate, 8, has orifices 32 for the passage of the filtered liquid downward and for the ascent of clear liquid in washing the filtering material. The filtering material does not come in contact with the piston or the bottom plate, owing to the interposition of sheets 33 and 34 of wire fabric. The sheet 33 is in contact with the under side of the piston; but the sheet 34 is kept from contact with the bottom plate, 8, by radial slats 35, which are laid on the bottom plate. These slats insure the free passage of the liquid to and from the orifices 10 and 32.

In ordinary use the pipe 12 is in connection with the liquid to be filtered, which must be under at least sufficient pressure to carry it into the chamber 4. The cock 13 is in position to connect the pipe 12 with hose 14, and the cock 16 in position to connect hose 14 with tube 3, and the cock 20 in position to connect the pipe 19 with the discharge 21. The liquid flows from pipe 12 through hose 14 and tube 3 into chamber 4, from which it passes through orifices 11 of the piston into the filtering-chamber 9, from that through the orifice 10 into the chamber 18, and from thence through the pipe 19 to the discharge-spout 21, which may be coupled to a pipe, and the filtered liquid carried where desired. This course of the liquid is indicated by arrows.

To cleanse the filter, the pipe 12, if not already in connection with the hydrant, is put in connection therewith or with some other source of clean water. The cock 13 is turned so as to connect the pipe 12 with the hose 15, the cock 20 is turned so as to connect the hose 15 with the pipe 19, and the cock 16 is turned so as to connect the tube 3 with the discharge-spout 17. The course of the water will now be through hose 15, pipe 19, chamber 18, and orifice 10 into the filtering-chamber 9, through which it will pass upward through orifices 11 into the chamber 4, and from chamber 4 down the tube 3 to the discharge 17. While the water is passing through the filtering-chamber the piston may be raised and lowered by the lever 25 and given rotary reciprocation by the handle 24, so as to agitate the filtering material and discharge the objectionable matters collected from the filtered liquid.

I claim as my invention—

The combination, in a filter, of a piston capable of rotary reciprocation, forming the top of the filtering-chamber, and armed with pins projecting into the filtering material, and the bottom of the filtering-chamber having pins projecting into the chamber, substantially as set forth.

FRANK TREBAU.

In presence of—
SAML. KNIGHT,
EDWD. S. KNIGHT.